(12) United States Patent
Rockenfeller et al.

(10) Patent No.: US 7,630,856 B2
(45) Date of Patent: ***Dec. 8, 2009

(54) THERMAL MANAGEMENT COMPUTING SYSTEM AND METHOD

(75) Inventors: Uwe Rockenfeller, Boulder City, NV (US); Kaveh Khalili, Boulder City, NV (US)

(73) Assignee: Rocky Research, Boulder City, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/053,431

(22) Filed: Mar. 21, 2008

(65) Prior Publication Data

US 2008/0306704 A1 Dec. 11, 2008

Related U.S. Application Data

(60) Provisional application No. 60/942,633, filed on Jun. 7, 2007.

(51) Int. Cl.
*G06F 15/00* (2006.01)
*H05K 7/20* (2006.01)
*G05D 23/00* (2006.01)

(52) U.S. Cl. .................. 702/132; 361/688; 700/299

(58) Field of Classification Search ................ 702/130, 702/132, 182, 186; 361/687, 688; 700/299
See application file for complete search history.

(56) References Cited

U.S. PATENT DOCUMENTS

| 5,752,011 | A | 5/1998 | Thomas |
| 5,974,557 | A | 10/1999 | Thomas |
| 7,227,749 | B2 | 6/2007 | Rockenfeller |
| 2006/0117779 | A1* | 6/2006 | Liebenow .................. 62/259.2 |
| 2006/0120036 | A1* | 6/2006 | Rockenfeller ............... 361/688 |
| 2006/0278370 | A1 | 12/2006 | Rockenfeller et al. |

* cited by examiner

*Primary Examiner*—Bryan Bui
(74) *Attorney, Agent, or Firm*—Knobbe, Martens, Olson & Bear LLP

(57) ABSTRACT

A thermal management method of operation to cool critical heat generating components and when a critical electronic component approaches its designated maximum operation temperature or its rate of temperature increase is determined to be in excess a predetermined level, its operating speed is reduced in small increments (1% to 5%), and/or a cooling fan speed it increased in small increments, (1% to 5%), and, if necessary, operation of a variable capacity heat transfer component is induced to cool the critical component.

13 Claims, 1 Drawing Sheet

THERMAL MANAGEMENT COMPUTING SYSTEM AND METHOD

CROSS-REFERENCE TO RELATED APPLICATIONS

This application claims priority to U.S. Provisional Patent Application No. 60/942,633, filed on Jun. 7, 2007, which is hereby expressly incorporated by reference in its entirety.

SUMMARY OF THE INVENTION

The following disclosure describes a computing system and a thermal management method of operation to cool critical heat generating electronic components. Cooling is carried out in small increments whereby critical components continue to operate at speeds of at least about 80% or more of their respective designated maximum operating speeds. According to the method, when a critical electronic component approaches its designated maximum operating temperature, its operating speed is reduced in small increments, and/or a cooling fan speed is increased in small increments, and, if necessary, operation of a variable capacity heat transfer component is induced to cool the critical component.

DETAILED DESCRIPTION

Figure 1:
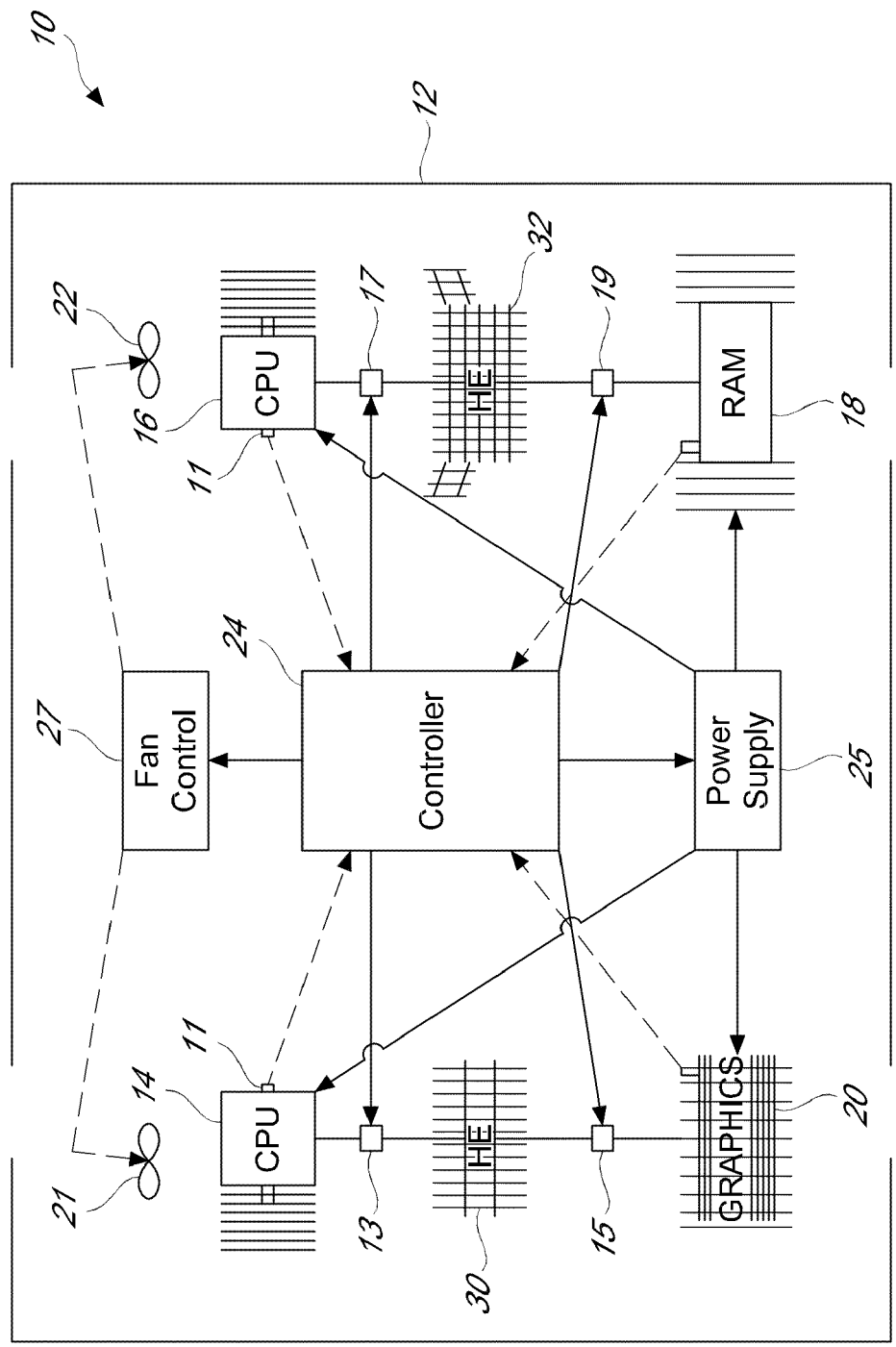
FIG. 1 schematically illustrates an example computing system having critical components and configured to carry out the described thermal management method.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an ALPHA® processor. In addition, the microprocessor may be any conventional special purpose microprocessor such as a digital signal processor or a graphics processor. The microprocessor typically has conventional address lines, conventional data lines, and one or more conventional control lines.

The system is comprised of various modules as discussed in detail below. As can be appreciated by one of ordinary skill in the art, each of the modules comprises various sub-routines, procedures, definitional statements and macros. Each of the modules are typically separately compiled and linked into a single executable program. Therefore, the following description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be used in connection with various operating systems such as LINUX, UNIX or MICROSOFT WINDOWS®.

The system may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code.

The invention disclosed herein may be implemented as a method, apparatus or article of manufacture using standard programming or engineering techniques to produce software, firmware, hardware, or any combination thereof. The term "article of manufacture" as used herein refers to code or logic implemented in hardware or computer readable media such as optical storage devices, and volatile or non-volatile memory devices. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices.

The method and computing system described herein are designed to maintain high computer operating efficiency and prevent substantial reduction of operating speed of critical computing system components, for example, a CPU or other microprocessor, video graphics chip, RAM, hard disk or storage media, as they approach or reach designated maximum operating temperature. In a thermal management system, the temperature of each of the critical electronic components is monitored and if a critical component temperature approaches its designed maximum operating temperature (or other temperature not desired to be exceeded), or the rate of temperature of the component exceeds a predetermined limit, steps are taken to avoid substantial operating speed reduction of the critical component. Each of the monitored critical components have designated maximum operating temperatures and maximum operating speeds or frequencies, respectively. According to the method described herein, when a critical component temperature approaches its designed maximum operating temperature, or when the rate of temperature increase of the critical component exceeds a predetermined limit, one or more of the following procedures is initiated as necessary to maintain operation of the critical component, preferably within at least about 80% of its designated maximum operating speed. In response to a detected temperature approaching the designated maximum operating temperature, or in response to determination that the rate of temperature increase exceeds a predetermined limit, a controller initiates one or more of the following steps:

(a) reduces the operating speed or clock speed of the detected component in small increments of between about 1% and about 5% until a predetermined component temperature is reached, and/or until the rate of temperature increase of the detected component falls below a desired rate; and/or (b) increases the speed of one or more fans for cooling the detected component in small increments of between about 1% and about 5% until a predetermined lower detected component temperature is reached, and/or until the rate of temperature increase of the detected component falls below a desired rate; and if carrying out step (a) and/or step (b) does not result in reducing the temperature of the detected component to the predetermined lower temperature, and/or until the rate of temperature increase of the detected component falls below a desired rate, within a predetermined time limit, (c) induces thermal communication between the detected component and a variable capacity heat transfer component.

In one embodiment, the thermal management system includes a controller configured to receive temperature signals from temperature sensors installed in or on the various critical heat generating electronic components, such as those described above. The controller is provided with a software program comprising instructions for implementing logic capable of determining the rate of temperature increase of any one or more of the critical components, comparing the rate with predetermined temperature slopes or increases, and determining that the rate of temperature increase of the detected critical component exceeds a predetermined limit. In response to such a condition, the controller initiates one or more of the aforesaid steps for cooling the critical component temperature while maintaining operation of the critical component within at least about 80%, preferably about 85%, and more preferably about 90% of its designated maximum operating speed. The computing system is provided with temperature sensors for monitoring the core temperature of the system or the core temperature of each critical electronic component as well as means for relaying the sensed temperatures to the controller. The controller is in electrical communication with each of the critical components and has the capability to reduce the operating speed of each of the critical components in small increments by controlling the clock speed, for example by providing a frequency control signal to a critical component clock, or alternatively by signaling a reduction of voltage supplied to the critical component by a power supply.

The computing system is also provided with one or more fans capable of operating at variable speeds and positioned for cooling one or more of the critical heat generating electronic components. The fans and fan speed are also controlled by the controller whereby the controller is configured to and capable of increasing the fan speeds in small increments of between about 1% and about 5% as well as for reducing fan speed. The operational speed of a fan and its cooling ability may be increased (or decreased) by the controller signaling for increased voltage supplied to the fan. For such purpose, a fan control circuit may be provided, and the controller may communicate signals to the fan control circuit for incrementally increasing (or decreasing) a fan speed to cool a critical component until a desired lower temperature or temperature reduction rate is achieved.

The computing system is provided with one or more variable capacity heat transfer components installed to provide additional selective cooling of one or more of the critical components if necessary to maintain critical component operating speed at 80% or more of its designated maximum speed. Examples of suitable variable capacity heat transfer components include, for example, heat pipes and heat spreaders incorporating a liquid/vapor refrigerant for dissipating the heat. Suitable heat pipes operate to alter refrigerant charge, which in turn increases or reduces the heat transfer capacity. Such heat pipes are well known to those skilled in the art. A useful heat spreader is described in U.S. patent application Ser. No. 11/148,773 (U.S. Patent Publication No. 2006-0278370 A1, published Dec. 14, 2006), filed Jun. 8, 2005, the description of which is incorporated herein by reference in its entirety. Such variable capacity heat transfer components may be positioned and dedicated for cooling a single critical component or for cooling multiple components. In that regard, the computing system described herein also includes devices described as modulating connectors or switches to provide selective thermal communication and heat transfer between the heat transfer component and the one or more critical components to which it is partnered. The modulating connectors or switches are positioned to provide thermal communication between the critical component and a variable capacity heat transfer component, and the heat transfer is selectively induced or initiated by the controller when necessary to cool a critical component (or to reduce the rate of temperature increase) without reducing its operating speed or frequency to below the previously stated limits.

Examples of useful switching and modulating components include bi-metal switches that close or open on thermal contact or comprise a series of parallel bi-metal switches for thermal contact modulation. Other useful modulators or switches include electromagnetic switches for closing contacts, such as solenoids. Series of parallel solenoids may be used to provide modulating cooling in discrete steps. Other examples of such switching or modulating connectors are described in U.S. Pat. No. 7,227,749, issued Jun. 5, 2007, the relevant descriptions of which are incorporated herein by reference.

In another embodiment, the method and apparatus includes the capability and configuration to determine that if the temperature of one or more of the critical components is about 10% or more below its designated maximum operating temperature, a fan speed which is operating to further cool such lower temperature component can be reduced. Thus, when a relatively slow operating critical component or one that is relatively inactive is detected, and such component does not require substantial cooling, the speed of a fan positioned for cooling such component can be reduced to any point when further cooling is not needed, thereby further reducing the amount of heat generated by the fan motor within the computer case. The fan control may be operated by the controller as previously described.

In carrying out the above-described method, different sequences of the steps to be taken to prevent a critical component from overheating and for maintaining operation within the previously described operating speeds may be prioritized for different sequential step operation. For example, step (a) may be first initiated with the different small incremental operating speed reductions, and, if the desired critical component cooling is not achieved within a predetermined time, step (b) can be initiated with small incremental increases in fan speed, only if necessary for achieving the desired component temperature and while maintaining suitable operating speed. Alternatively, step (b) may be first carried out for a predetermined time and thereafter, only if necessary, concurrently carrying out step (a) until the temperature of the detected critical component is reduced to or below the predetermined limit. Yet, in another embodiment, steps (a) and (b) may be both initiated concurrently and carried out until the temperature of the critical component is reduced to or below the predetermined limit.

The controller is provided with a program that includes parameters (e.g., pre-programmed or user defined via input mechanisms) defining the previously described respective critical component designated maximum operating speeds, designated maximum operating temperatures, predetermined limits of temperature increase rates, predetermined time limits as well as instructions for determining which steps or combination of steps are to be used to cool the components while maintaining respective operating frequency (speed) at about 80% or more. The controller program also includes instructions for determining the level of small incremental frequency reductions and/or fan speed increases to be used. Thus, for example, the controller may determine that because of existing critical component operating speed requirements, any reduction in operating speed of the critical component may compromise the present computer demand. Step (b) cooling would then be initiated and extended for a predetermined time, prior to also initiating step (a), and, if necessary, step (e). Similarly, if small incremental speed reductions of a critical component are determined not to compromise existing computer operational demands, step (a) may be first initiated. In one embodiment, it is preferred that step (c) be initiated only when either step (a) and/or step (b) does not accomplish the desired temperatured reduction of one or more of the critical components while maintaining desired operating speed.

FIG. 1 schematically illustrates an example of a computing system 10 having a plurality of critical heat-generating electronic components designated as CPU 14, CPU 16, RAM 18 and graphics chip 20 positioned in computer case or housing 12. The critical components shown in this example are provided with heat transfer fins exposed to cooling air provided by fans 21 and 22. The controller 24 is configured and provided with a program including instructions for carrying out the previously described methods. Each critical component 14, 16, 18 and 20 is provided with a temperature sensor 11 configured to send a temperature signal to the controller 24. The controller 24 is configured to communicate with a power supply 25 and a fan control circuit 27. The power supply 25 is configured to regulate power to each of the critical components and to reduce operating speed thereby cooling a critical component as determined by the controller program as described above. The power supply 25 may also regulate voltage to each fan 21 and 22 or to fan control circuit 27 for operating the fan at different speeds as determined by the controller depending on cooling requirements for the respective critical components. Also shown in the embodiment illustrated are variable capacity heat exchangers 30 and 32 as previously described. Each of the heat exchangers 30 and 32 is in thermal communication with two of the critical electronic components via switching or modulating connectors (or switches) 13, 15, 17 and 19. The controller 24 is programmed to signal a modulating connector (or switch) to initiate thermal communication between a heat exchanger (30 or 32) and a critical component (14, 16, 18 or 20) when the controller 24 determines that additional cooling is required as described above. The number of such switches or connectors used in this example is not critical and may depend on the number of critical components and the number of heat exchangers used. Thus, one heat exchanger may serve one or more critical components and a modulating connector or switch may be used between each heat exchanger and a critical component.

What is claimed is:

1. A method of thermal management in a computing system comprising a plurality of critical heat generating electronic components having designated maximum operating temperatures and designated maximum operating speeds, respectively, comprising:
   monitoring the temperature of said critical components and the rate of temperature increase of said critical components;
   determining that the temperature of a detected critical component approaches its designated maximum operating temperature, or determining that the rate of temperature increase of said detected component exceeds a predetermined temperature, and, in response to such determination initiating one or more of the following procedures as necessary to maintain operation of said detected component at or above at least about 80% of its designated maximum operating speed:
   (a) reducing the operating speed of said detected component in increments of between about 1% and about 5% until a predetermined component temperature is reached,
   (b) increasing the speed of one or more fans for cooling said detected component in increments of between about 1% and about 5% until the predetermined component temperature is reached, and
   if carrying out step (a) or step (b) does not result in reducing the temperature of said detected component to the predetermined lower temperature within a predetermined time limit,
   (c) inducing thermal communication between said detected component and a variable capacity heat transfer component.

2. The method of claim 1 further comprising determining that the temperature of one or more of said critical components is lower than about 10% below its designated maximum operating temperature, and in response to such determination, reducing the fan speed of a fan configured to cool such lower temperature component.

3. The method of claim 1, further comprising first carrying out step (a) for a predetermined time and thereafter, only if necessary, concurrently carrying out step (b) until the temperature of said detected critical component is reduced to or below said predetermined component temperature.

4. The method of claim 1, further comprising first carrying out step (b) for a predetermined time and thereafter, only if necessary, concurrently carrying out step (a) until the temperature of said detected critical component is reduced to or below said predetermined component temperature.

5. The method of claim 1, further comprising initiating and concurrently carrying out steps (a) and (b) until the temperature of said detected critical component is reduced to or below said predetermined component temperature.

6. The method of claim 1, further comprising prior to initiating either step (a) or step (b), determining that the operating speed of said detected component is above about 80% of its designated maximum operating speed and if not, first initiating step (b) without initiating step (a) until the temperature of said detected component is cooled to the predetermined component temperature.

7. A computing system comprising a plurality of critical heat-generating electronic components having designated maximum operating temperatures and designated maximum operating speeds, respectively, temperature sensors for measuring the temperatures of each of said critical components and means for relaying signals relating to sensed temperature to a controller, and one or more fans positioned for cooling one or more of said critical components, the computing system characterized by:
   a controller configured to monitor the temperature of each of said critical components and for regulating the operating speed of each of said critical components and the speed of the said one or more fans, said controller configured to determine the rate of temperature increase of said critical components, and in response to a detected critical component temperature above a predetermined limit, or rate of temperature increase in excess of a predetermined level, configured to reduce the operating speed of the detected critical component and/or to increase the speed of said one or more fans in increments of between about 1% and about 5% until the operating temperature of said detected critical component is reduced to or below said predetermined limit.

8. The computing system of claim 7, further characterized by one or more variable capacity heat transfer components and devices configured for inducing thermal communication between said one or more heat transfer components and one or more of said critical components.

9. The computing system of claim 8, wherein said one or more variable capacity heat transfer components comprise one or more of variable capacity heat pipes and liquid/vapor refrigerant heat spreaders.

10. The computing system of claim 8, wherein said devices comprise one or more of switches and thermal modulators.

11. The computing system of claim 8, wherein said controller is further configured to operate said variable capacity heat transfer components.

12. The computing system of claim 8, wherein said controller is configured to operate said devices.

13. A computing system of claim 10, wherein said computing system is configured to operate said switches or thermal modulators.

* * * * *

UNITED STATES PATENT AND TRADEMARK OFFICE
CERTIFICATE OF CORRECTION

| | |
|---|---|
| PATENT NO. | : 7,630,856 B2 |
| APPLICATION NO. | : 12/053431 |
| DATED | : December 8, 2009 |
| INVENTOR(S) | : Rockenfeller et al. |

It is certified that error appears in the above-identified patent and that said Letters Patent is hereby corrected as shown below:

On the Title Pg, Item (57) Abstract, Line 6, After "excess" insert -- of --.

On the Title Pg, Item (57) Abstract, Line 8, Change "it" to -- is --.

Col. 5, Line 6, Change "(e)." to -- (c). --.

Col. 5, Line 11, Change "temperatured" to -- temperature --.

Signed and Sealed this

First Day of June, 2010

David J. Kappos
*Director of the United States Patent and Trademark Office*